United States Patent [19]
Friedline et al.

[11] 3,953,143
[45] Apr. 27, 1976

[54] CLAMPING DEVICE

[75] Inventors: Ernest J. Friedline, Latrobe; Robert N. Mitchell, Ligonier; Linn R. Andras, Latrobe, all of Pa.

[73] Assignee: Kennametal Inc., Latrobe, Pa.

[22] Filed: Feb. 20, 1975

[21] Appl. No.: 551,362

[52] U.S. Cl. ............................... 403/374; 403/371
[51] Int. Cl.² ........................................... F16D 1/06
[58] Field of Search ........... 403/374, 370, 371, 366, 403/350, DIG. 8; 299/93; 85/1 SS

[56] References Cited
UNITED STATES PATENTS

| | | | |
|---|---|---|---|
| 2,508,409 | 5/1950 | Lord | 403/371 X |
| 2,842,233 | 7/1958 | Greenleaf | 403/370 |
| 2,966,968 | 1/1961 | Skeel | 403/370 |
| 3,032,152 | 5/1962 | Titsler | 403/374 |
| 3,290,641 | 12/1966 | Payne et al. | 403/362 X |
| 3,679,246 | 7/1972 | Bloomquist | 403/366 X |

*Primary Examiner*—Andrew V. Kundrat
*Attorney, Agent, or Firm*—Melvin A. Crosby

[57] ABSTRACT

A clamping device for disposition in a blind hole or slot of a support body for locating and securing members such as hardened metal cutting inserts and the like. The clamping device of the present invention has an expandable plug member loosely receivable in a blind hole or slot and a rotatable member disposed centrally in the plug member such that upon rotation the plug member expands in the blind hole or slot to firmly clamp an insert between a wall of the blind hole and the expandable plug.

5 Claims, 6 Drawing Figures

CLAMPING DEVICE

The present invention relates to clamping devices for use in blind holes and slots and, in particular, for securing hardened metal cutting inserts in a support body without necessitating any form of threaded engagement or the like with the support body.

In particular, and by way of example, in a disc-like support body, such as a cutter body, there are usually formed slots or recesses extending radially inwardly from the support body periphery in which hardened metal cutting inserts are disposed for cutting engagement with a workpiece. In such cutter support bodies, a clamping arrangement must be provided in order to hold the inserts firmly in a fixed relative position with the cutter body during cutting operations. The particular clamping arrangement should also allow for ease of indexing and replacement of the cutting insert.

Clamping arrangements of the prior art are usually comprised of a threaded member for threaded engagement with the cutter support body and a cooperating clamp member for engagement with the insert. The clamping forces provided by such an arrangement are usually bi-directional on the insert, the threadedly engaged member providing a downward force toward a bottom wall of the slot and the cooperating clamp member providing a directional force toward the side wall of the slot. When such a clamping arrangement is used, there is an added expense in the fabrication of the cutter body in that tapped and threaded holes must be provided to secure the clamping arrangements therein.

With the foregoing in mind, a primary objective of the present invention is the provision of a clamping device for use in a blind hole or slot not requiring tapped and threaded holes to be found in the slot or hole.

Another object of the present invention is to provide a simple, efficient, quick-acting and easily removable clamping arrangement in blind holes or slots in a support body.

Another object of the present invention is to provide a positive and secure clamping arrangement to holding cutting inserts from moving when engaging a workpiece.

BRIEF SUMMARY OF THE INVENTION

The device according to the present invention comprises a plug member loosely receivable in a blind hole in a support body along with an element to be clamped in the blind hole and a means for expanding the plug member in the blind hole. The means for expanding takes the form of a threaded screw or eccentric pin supported in the plug member and operating upon rotation to expand the plug member and clamp the element firmly against one wall of the hole.

The plug member generally consists of a short circular plug having a central hole in which the threaded screw or eccentric pin may rotate. The forward and rear faces are shaped for abutment with the element to be clamped and a side wall of the hole in which it is to be clamped.

Slots formed in the side walls of the plug member allow relative outward movement between portions of the plugs front and back wall when outward force is exerted internally in the central hole of the plug by the threaded member or eccentric pin. The exact nature of the present invention and the objects and advantages thereof will become more clearly apparent upon reference to the following detailed specification taken in connection with the accompanying drawings in which.

DETAILED DESCRIPTION OF THE INVENTION

Figure 1:
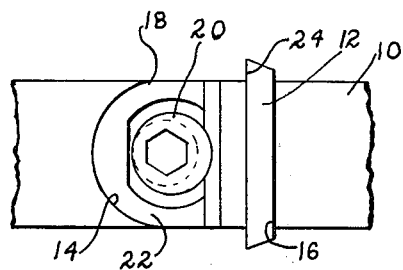
FIG. 1 is a top view of a disc-like support body with a blind hole or slot with one type of clamping arrangement of the present invention disposed therein.

As will be seen from FIG. 1, there is depicted a general support body 10 having a blind hole, or slot, 22 extending inwardly with front wall 16 and rear wall 14. Disposed in the blind hole or slot is a particular embodiment of the present invention comprising a plug member 18 and an eccentric pin member 20 which clamps hardened cutting insert 12 against the front side wall 16 of cutter support body 10.

Figure 2:
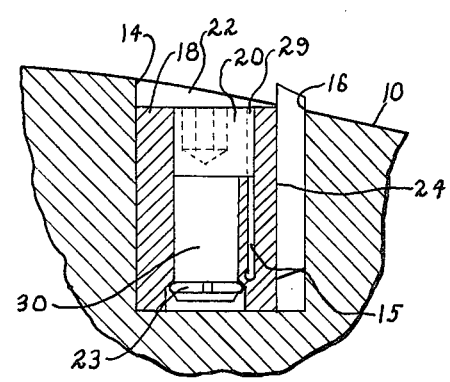
FIG. 2 is a side view along line II—II of FIG. 1.

The particular construction of the clamping device shown in FIG. 1 is better shown in FIG. 2. In FIG. 2, the general support body 10 is shown with the blind hole or slot 22 extending inwardly of the body. The clamping device comprises a plug member 18 loosely received in slot 22 and having a slot 15 formed through its lateral two side walls and extending downwardly from the top of the plug and parallel to the front wall 24 of plug member 18.

A rotatable eccentric pin 20 is disposed in a central bore of plug member 18. The rotatable eccentric pin 20 is comprised of an eccentric top portion 29 and a smaller circular shank lower portion 30 which is grooved on its lower end for engagement with snap ring 23. The rotatable eccentric pin 20 is kept captive in plug member 20's central bore by the snap ring 23's abutment with a shelf formed in the central bore.

The clamping device is operative with eccentric pin member 20 in a predetermined position plug member 20 and hardened insert 12 are freely receivable in slot 22. Upon rotation of eccentric pin 20, the eccentric top portion 29 of pin 20 abuttingly engages the front wall 24 of plug 18 forcing it to expand outwardly. This outward movement clamps hardened insert 12 firmly between the plug member 18 and one wall of slot 22.

Figure 3:
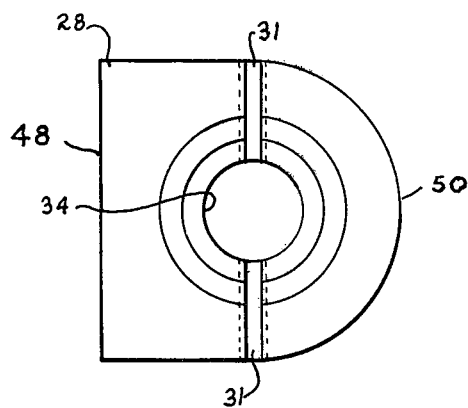
FIG. 3 is a top view of another construction of the present invention.
Figure 4:
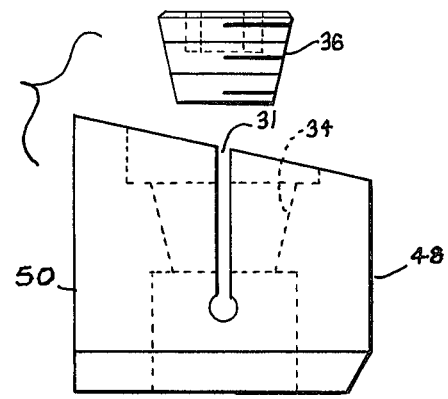
FIG. 4 is a side view of the construction shown in FIG. 3 in combination with its engaging threaded member.

In FIGS. 3 and 4, an alternate construction of the clamping device of the present invention is shown. Therein is shown a plug member 28 for disposition in generally the same type of hole or slot 22 as shown in FIGS. 1 and 2. Plug member 28 is provided with a centralized bore 34 with pipe threads formed therein and a slot 31 through the lateral side walls of member 28 and extending downwardly from the top surface of member 28.

The plane of slot 31 is parallel to the front face 48 of member 28 and contains the center line of bore 34. A tapered pipe plug 36 having pipe threads formed thereon is threadedly engaged in central bore 34 of plug member 28. With the plug member 28 and insert 12 loosely received in slot 22, advancement of tapered pipe plug 36 into central bore 34 increases the width of slot 31 and causes abutment of front wall 48 with insert 12 and abutment of rear wall 50 with one side of slot 22, firmly engaging the insert 12 in slot 22.

Figure 5:
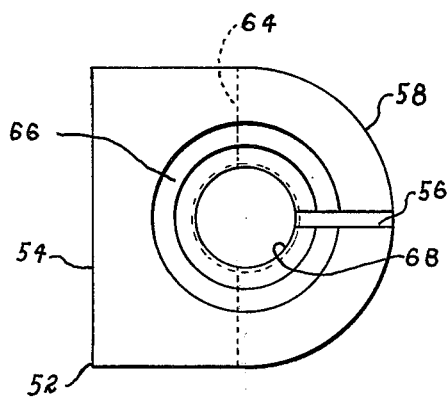
FIG. 5 is a top view of still another construction of the present invention.
Figure 6:
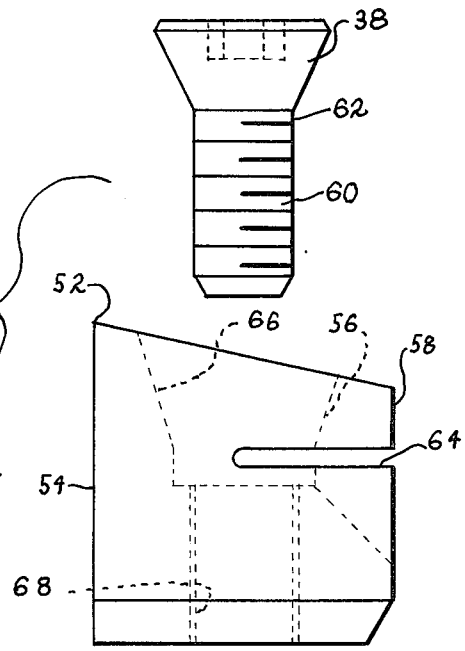
FIG. 6 is a side view of the construction shown in FIG. 5 in combination with its engaging threaded member.

In FIGS. 5 and 6, still another alternate construction of the present invention is shown. A plug member 52 is shown having a centralized and threaded bore portion 68 and a conical bore portion 66 in connection with portion 68. A slot 56 is formed in rear wall 58 of plug 52 extending downwardly from plug 52's top surface. The plane of the slot is perpendicular to front face 54 of plug 52 and contains the center line of threaded bore portion 68.

Another slot 64 is formed through the rear face 58 of plug 52 and extends forwardly in the plug 52. The plane of slot 64 is perpendicular to the plane of front face 54 and parallel to the plane of the bottom face of plug 52. Screw member 62 is a threaded member having a threaded portion 60 and a conically formed portion 38. Threaded portion 60 engages threaded bore portion 68 and conically formed portion 38 abuts conical portion 66 of plug 52. Threadedly advancing screw member 62 into bores 66 and 68 increases the width of slots 56 and 64 causing front face 54 to firmly abut insert 12 and rear face 58 to firmly abut one wall of slot 22.

Modifications may be made within the scope of the appended claims.

What is claimed is:

1. A clamping device for clamping an element against one wall of a hole, such as a blind hole in a support body, said device comprising; a plug member having a slot formed therein such that portions of the outside walls of the plug member are expandable in outward direction, the plug member dimensioned so as to be loosely receivable with said element in said hole with the element engaging one wall of the hole and the plug member being disposed between the element and the side of the hole opposite said one wall; a central bore formed in said plug member, and means for expanding said plug member comprising an eccentric pin located and supported in said central bore.

2. A clamping device according to claim 1 in which said plug member has a flat forwardly face for abutting engagement with said element and a semicircular rearwardly face for abutting engagement with the side of the hole opposite said one wall.

3. A clamping device according to claim 2 in which the plane of said slot is parallel to the plane of said flat forwardly face.

4. A clamping device for clamping an element against one wall of a hole, such as a blind hole in a support body, said device comprising; a plug member dimensioned so as to be loosely receivable with the element in said hole with the element engaging one wall of the hole and said plug member being disposed between the element and the side of the hole opposite the one wall, opposing faces on said plug to engage the element and the opposite side of the hole, first and second slots formed in said plug member, the plane of the first slot being substantially perpendicular to the plane of the second slot and both planes of said slots being substantially perpendicular to the plane of one of the opposing faces of said plug member; and means for expanding said plug member, said means being rotatably supported in said plug member and operable upon rotation to expand said plug member and clamp said element firmly against one wall of the hole, one of said plug member opposing faces is a flat forward face for abutting engagement with said element and the other opposing face is a semicircular rearward face for abutting engagement with the side of the hole opposite said one wall.

5. A clamping device according to claim 4 in which said means for expanding said plug member is a threaded member threadedly engaging a central bore of said plug member, said threaded member having a conical portion which increases the width of said slot when it is rotatably advanced into the central bore of the plug member.

* * * * *